United States Patent [19]
Harris

[11] 4,048,550
[45] Sept. 13, 1977

[54] FLUX CORRECTIVE CONTROL APPARATUS FOR MOTOR DRIVES
[75] Inventor: Walter R. Harris, Williamsville, N.Y.
[73] Assignee: Westinghouse Electric Corporation, Pittsburgh, Pa.
[21] Appl. No.: 546,849
[22] Filed: Feb. 3, 1975
[51] Int. Cl.² .............................................. H02P 3/14
[52] U.S. Cl. .................................... 318/356; 318/521; 318/532
[58] Field of Search ............... 318/338, 493, 521, 532, 318/356

[56] References Cited
U.S. PATENT DOCUMENTS

| 3,569,809 | 3/1971 | Comer | 318/338 |
| 3,735,220 | 5/1973 | Renner et al. | 318/493 X |
| 3,735,226 | 5/1973 | Pittner | 318/338 |
| 3,811,079 | 5/1974 | Tashiro et al. | 318/338 |
| 3,887,855 | 6/1975 | Klimo | 318/338 |

Primary Examiner—B. Dobeck
Attorney, Agent, or Firm—C. M. Lorin

[57] ABSTRACT

A direct current motor control apparatus includes corrective circuit for eliminating the influence of non-linearities on speed regulation as a result of load variations. A summer circuit at the input of the speed regulator algebraically combines signals representing respectively the armature current and voltage to derive a signal representing the counter-electromotive force of the motor. The latter signal is compared in the summer circuit with a signal representing motor speed for supplying a corrective error signal to the speed regulator, thereby to keep the air gap flux constant and provide a speed-load characteristic which is linear in relation to the armature current drop.

1 Claim, 3 Drawing Figures

FLUX CORRECTIVE CONTROL APPARATUS FOR MOTOR DRIVES

CROSS REFERENCE TO RELATED APPLICATIONS

The present application is related to the following concurrently filed patent application which is assigned to the same assignee as the present application:

Ser. No. 538,500, which was filed on Jan. 3, 1975, now U.S. Pat. No. 3,991,349, by Wesley H. Watson and John M. Bentley.

BACKGROUND OF THE INVENTION

The control apparatus according to the present invention finds general utility where one, or a plurality of direct current electric motors, must have a predetermined drive performance under all operating conditions, in particular irrespective of load, or speed changes.

The factors affecting the speed-load characteristic of a direct current motor are as follows:
1. IR drop in the armature circuit.
2. Series-field effect.
3. Current flowing in short circuited armature coils caused by interpole over compensation or brush shifting.
4. Armature distortion.
5. Interpole flux leakage.
6. Interpole saturation.

All of these factors are non-linear except the IR drop. It is desirable, though, that the speed-load characteristic be linear, for at least two reasons. (1), First, when regulating the speed of a direct-current motor, since the armature current is a function of the load, control of the speed and function of the armature current should be free from the non-linearities introduced by the above-mentioned factors, other than the IR drop. (2) The second reason for seeking linearity in the speed-load characteristic is that the mechanical time constant of the machine is a function of the torque, e.g. in close approximation of the load. If non-linearities are introduced, the mechanical time constant will vary and regulation will no longer be proportional to the flux reference.

These two points will be examined hereinafter, successively.

1. In order to improve, or define, the speed-load characteristic, a series-field is often used. The cumulative series-field provides a stabilizing effect by creating a drooping speed-load curve. Sometimes much series-field is required in order to get a drooping curve extending all over the intended range of regulation. Therefore at low speed (full field and reduced voltage) the series-field has very little effect. The droop and stall point, at low speed, are determined almost entirely by the IR drop of the motor. Also the calculated speed-load curves are usually more nearly linear than the actual test curves. In fact, the rapid droop in speed occurring for the first 25% of the load cannot be calculated. This rapid droop is thought to be due to the inability of the brushes to get a stable or ultimate contact drop established. Inconsistent circulating currents built-up among the armature coils being commutated at light loads are also accountable for this difficulty in determining the machine characteristic.

In addition, as a result of the lack of linearity, unusual speed rises occur in the speed-load characteristic curve from approximately ¼ load to twice load. These are also difficult to calculate. The factors affecting such non-linearities are unrelated and cannot be foreseen from one machine to another. They are due to such effects as: 1. Interpole saturation; 2. Interpole flux leakage; 3. Incorrectly located brushes-spacing and neutral position; and 4. Circulating current under the brushes.

It is desirable always to have motor speed-load characteristics which are drooping. While a series-field can be used to insure droop when rotation is unidirectional, in reversing drives the series-field must be reversed when the load is reversed. This makes the use of a series-field unpractical on reversing drives.

From the preceding it appears that while a determination of the speed-load characteristic by calculation of the desired droop, and all the more so its linearity, is not easy, the use of a series-field winding in generating such compound effect is not practical, nor desirable.

2. Another source of difficulty in regulating a DC motor drive stems from the mechanical time constant of the machine which is as follows:

$$To = JR/ab$$

where:
$To$ = mechanical time constant
$J = (WK^2)/g$
$a$ = volts per radian = $V/\omega$
$b$ = torque per ampere = $T/I$ The mechanical time constant can also be expressed as follows:

$$To = \frac{IR}{V} \times \frac{J\omega s}{T} \tag{1}$$

In this form it appears that the mechanical time constant is a function of the slope of the speed-torque curve. This function is not quite as shown by equation (1) since the flux changes in the motor do not react instantaneously. However, the fact that the mechanical time constant varies woth torque cannot be ignored, and on the basis of equation (1) it may be anticipated that the flux changes occurring in the motor which as seen earlier disturb the regulation will also have a direct effect on the mechanical time constant. If a motor has a characteristic which is flat, the mechanical time constant will drop to zero. If the speed-torque curve is non-linear, the mechanical time constant will vary as the slope of the tangent to the curve at the operating point. For example, assuming a flat, or somewhat rising characteristic, as load increases demagnetizing effects decrease the flux. If the flux changes takes place instantaneously, or have zero time constant, then, the mechanical time constant is zero, or negative. If the voltage is increased on the motor armature the motor will try to accelerate instantaneously. As current flows, the flux will be progressively weakened and the ability of the motor to accelerate progressively impaired. The current will rise until the overload relay trips or the motor flashes over.

Another practical example of the same type of difficulty, is where the load connected to the motor has a very high inertia, e.g. introduces a very long mechanical time constant. If, at the same time, the motor field time constant which delays the demagnetizing effects is very short, we would have essentially the same adverse results. If acceleration is called for, the motor current will rise dangerously.

A contrasting example can be found with a motor which is stable so that an increase in load will result in either no flux change, or in an increase in flux. In such case, the accelerating current for a slight voltage change will depend on the increase in voltage and the regulation of the motor. No excessive armature currents will occur.

While the preceding examples relate to drive systems without consideration of regulatory loops, it should be appreciated that when regulators are used the mechanical time constant is directly in the regulating loop of any speed or position regulating system. If the motor is unstable, or if the regulation curve is not linear, the mechanical time constant will change and control of the operation will be affected.

The situation encountered in practice is complex because the IR drop acts instantaneously, while the flux changes are delayed by the main field time constant. In fact, the effect of flux changes due to load will vary, depending on the system used and the relative values of the time constants stants involved.

Accordingly, the present invention provides control apparatus for direct current motor drive which overcomes these shortcomings. According to the present invention, there is provided a control apparatus causing the regulation of a direct current motor in relation to the load to be substantially linear, whereby flux changes due to load changes are minimized and in which the mechanical time constant is the same under all operative conditions. As a result changes in load, or speed, will not upset the system constants or system relations, and the motor drive will perform consistently as set. This is highly desirable.

The object of the present invention is to regulate the flux of a direct current motor with a linear speed-load characteristic.

Another object of the present invention is to eliminate non-linear effects of load changes in the regulatory loop of a field-controlled direct current motor.

A further object of the present invention is to regulate the speed of a field-controlled direct current motor under constant flux for a predetermined speed level of control.

SUMMARY OF THE INVENTION

The present invention resides in providing a field-controlled direct current motor in which the speed load characteristic is linear. To this effect, sensed armature current is subtracted from the armature voltage to derive a signal representing the counter-electromotive force. The latter is compared with a signal representing the speed of the motor in order to derive an error signal which is used to correct the air gap flux through the field regulator of the motor.

THE INVENTION

This invention relates to direct current motor drives in general, and more particularly to improved motor drives for stable operation at a selected speed despite changes in the driven load.

Figure 1:
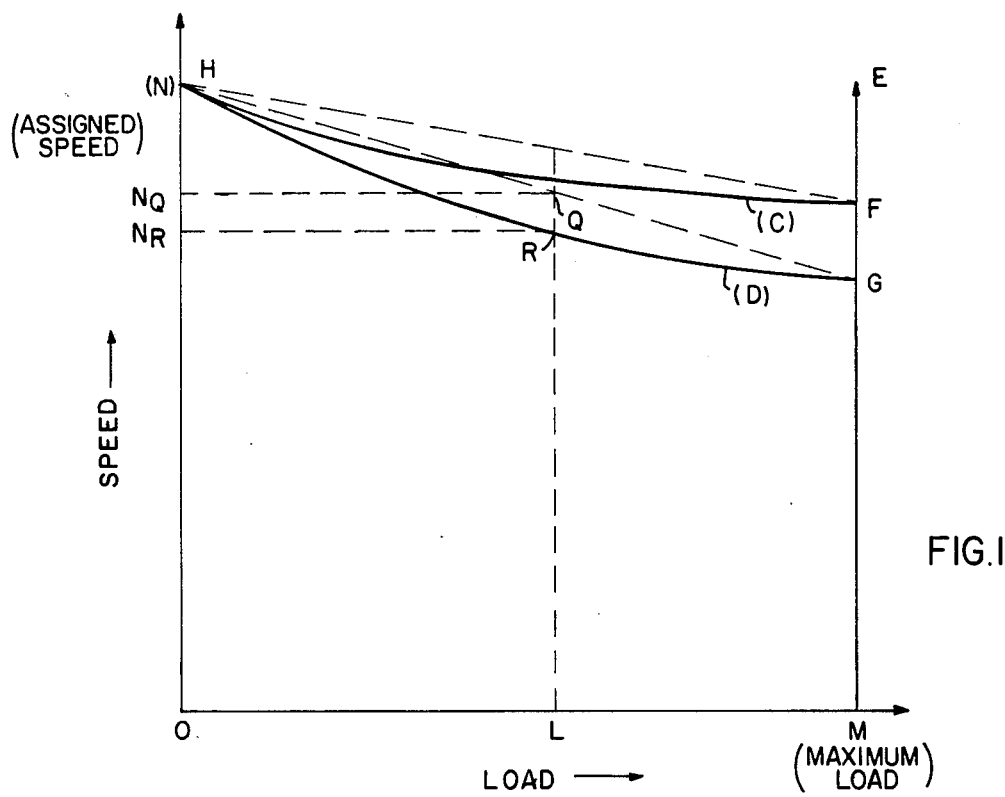
FIG. 1 shows by comparison speed-load characteristics typical of a direct-current motor with and without the control apparatus according to the present invention.

Referring to FIG. 1, the speed-load characteristic of a direct current motor is shown at (C) extending between point H of operation at zero load and assigned speed N, and point F of operation at a reduced speed MF when the load has the maximum expected value OM. In copending application the maximum expected value OM. In copending application Ser. No. 538,500 filed Jan. 3, 1975 (hereabove cross-referenced), it has been shown that when the inherent speed-load characteristic is such as (C) on FIG. 1, it may be desirable to increase the droop EF by an additional droop FG so as to obtain a characteristic (D) as shown on FIG. 1. In both instances of curves (C) and (D) it is observed that the characteristics have a pronounced curvature. This means that when the load varies, e.g. the armature current drop IR varies, then the speed of the motor is not equally affected along the curve between H and F or H and G. As explained hereabove, this is due to non-linear factors which affect the air gap flux to different extents when the load, or IR, varies. On the one hand, such changes in the load modify the flux of the machine, on the other hand, these introduce non-linear effects in the regulatory loop of the machine which control the flux, thus the speed, of the motor. Considering FIG. 1 and curve (D) for the sake of argument, it appears that for a load L the speed of the motor establishes itself at $N_R$, with the ordinate LR to the operating point R. Should the non-linear factors be eliminated, factors affecting the flux of the machine directly or indirectly through the regulatory loop, then operation of the motor will establish itself at Q on the linear curve drawn straight from H to G, instead of curve (D). At Q the speed is $N_Q$ instead of $N_R$. This means that for each value of IR (or the load) the speed follows the straight line HG.

In accordance with the present invention, whenever the speed of operation of the machine is $N_R$ instead of $N_Q$, an error $N_Q - N_R$ is detected and corrective action is taken through the regulatory loop of the machine to correct the flux so as to eliminate such error, thus bringing the operating point from R to Q.

Figure 2:
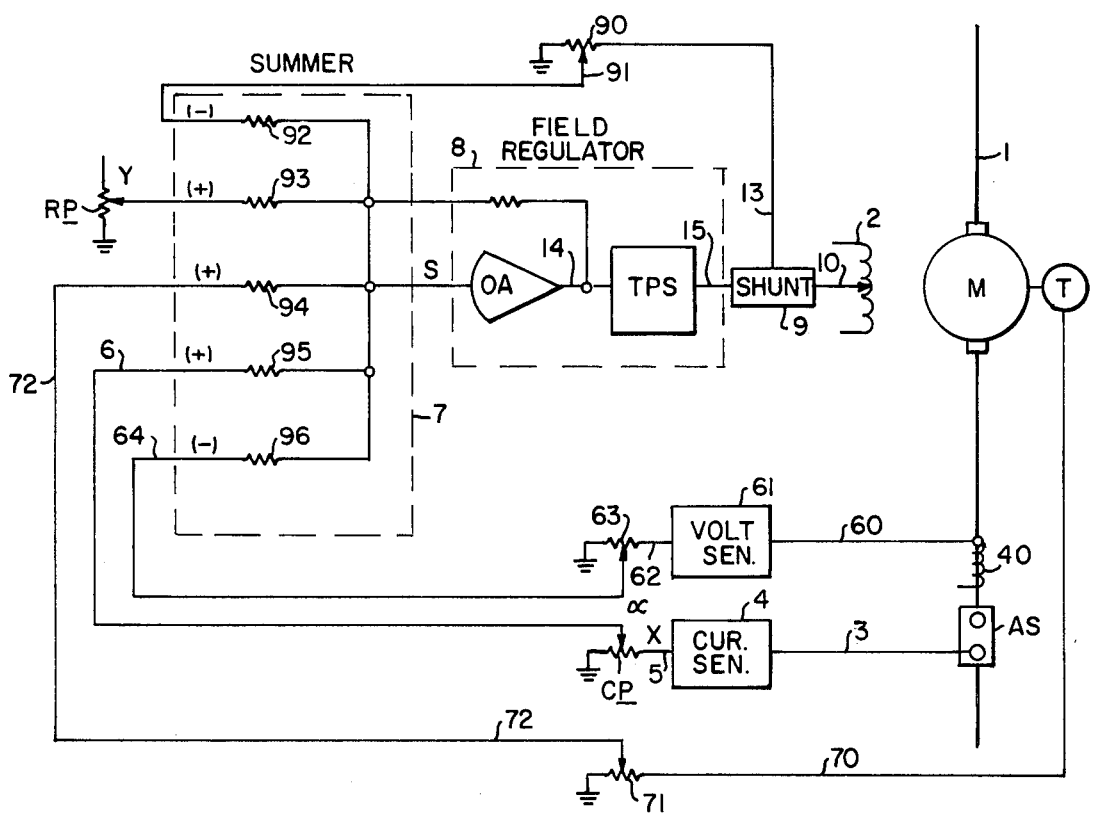
FIG. 2 is a block diagram representation of the control apparatus according to the present invention.

In order to explain how this is achieved, reference is made to FIG. 2 showing a motor M supplied with armature current I on line 1, and excited by a field winding 2. This field winding is supplied with field current on line 10 as controlled by a field regulator 8 including an operational amplifier and a thyristor power supply circut TPS generating the field current at its output 15 via a shunt 9 to which is connected a feedback loop comprising line 13, potentiometer 90 and line 91 from the tap thereof. A field current reference potentiometer RP under a reference voltage provides a reference signal Y from its tap on line 2. An armature current shunt AS inserted on line 1, supplies on line 3 current to a current sensor 4 from which a control signal X is derived on line 6 to a calibration potentiometer CP and a calibrated value $\alpha$ is obtained therefrom on line 6.

As explained in the referenced copending application, at the input S of the field regulator, the feedback signal (on line 91), the sensed armature current signal 2 (on line 6) and the field current reference signal Y (on line 2) are summed via respective resistors 92, 95 and 93. Adjustment of the calibration potentiometer CP determines the influence of the IR drop in the motor M, and the desired speed-load characteristic is obtained, such as (D) on FIG. 1, in relation to the inherent speed-load characteristic (C) of the machine. In accordance with the present invention, FIG. 2 contains the following additional and novel features. From a voltage sensor 40 is derived an indication of the armature voltage, e.g. the voltage between the two terminals of the motor's rotor. Such voltage indication is fed via line 60 to a voltage sensor 61 providing on line 62 a representative signal which is fed via potentiometer 63 and line 64 to a resistor 96 to be summed with the aforementioned signals at the input S of the field regulator 8. In addition a tachometer T provides on line 70, via potentiometer 71 and line 72 speed signal which is also received by the summer 7 at one end of a resistor 94 to be applied at the summing point S. The polarities of the five signals are as indicated on FIG. 2. The feedback signal on line 91 is negative, and so is the voltage signal on line 64. The others are of the opposite polarity. The sign of the feedback signal is required for negative feedback as generally known. The signification of the sign of the voltage representative signal on line 64, as opposed to the signs of the speed representative signal on line 72 and the armature current representative signal on line 6, can best be understood from the following explanations regarding the operation of the circuit of FIG. 2.

The speed N of a motor is given by the following equation:

$$N = K \frac{Ei}{\phi} \quad (2)$$

where $\phi$ is the flux from the field winding and Ei is the air-gap voltage. When there is no load, the air-gap voltage is equal to the armature voltage. When there is a load, e.g. an armature current I flows in the armature of resistance R, and an ohmic drop intervenes. The equation (2) becomes:

$$N = K \frac{E - IR}{\phi} \quad (3)$$

where $E$ is the armature voltage and IR is the ohmic drop in the armature.

Considering equation (3) it appears that if $N$ is varied from N to $N_R$ along curve (D) of FIG. 1 when the load has varied from D to L at which the armature current drop is R, such value $N_R$ should have been $N_Q$ as a result of $E_i$ becoming E−IR if $\Phi$ had remained constant. Therefore it is necessary to correct the flux $\Phi$ by changing the field current so as to leep $\phi$ constant to the extent that the error appears as $N_Q - N_R$. Considering now FIG. 2, it is seen that the tachometer generates on line 72 a signal which represents $N_R$ rather than $N_Q$. Such signal is compared with the difference between signals representing E, on line 64 and representing IR on line 6, and an error is detected at the summing point S which introduces a control signal for the field regulator 8 such as to correct the flux $\phi$, thus the speed, so that the operating point passes from R to Q in accordance with the corrected speed $N_Q$. The role of signal Y on line 2 and the feedback signal on line 91 is to assign the desired speed N at point H for the no-load condition on the speed-load characteristic.

THE PREFERRED EMBODIMENT

Figure 3:
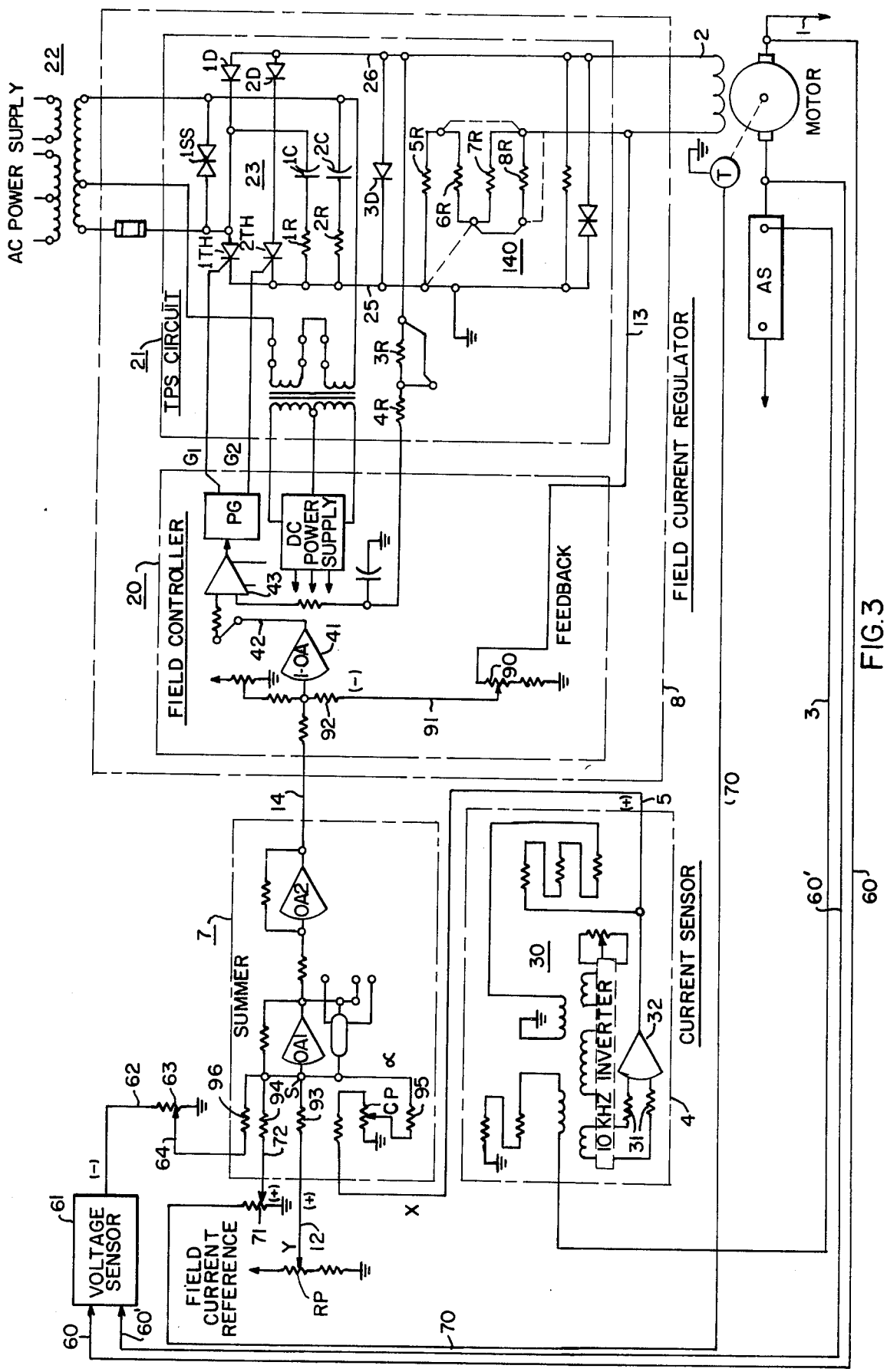
FIG. 3 shows the preferred embodiment of the invention.

The invention will now be considered with more details by reference to FIG. 3 depicting the preferred embodiment. In particular, FIG. 3 shows the internal circuitry of current sensor 4, summer 7 and the field regulator 8.

The current sensor 4 is essentially a direct current amplifier supplied with DC voltage, on lines 3 of both polarities, as derived from the armature current shunt AS. An inverter 30, operating at 10 KHZ, converts DC to AC and, after transformer coupling, AC to DC. The analog armature current signal so becomes an input signal supplied on lines 31 to an operational amplifier 32. The latter, on line 5 at the output, thereof provides the signal X described earlier by reference to FIG. 2, which is a signal representative of the sensed armature current.

Summer 7 includes cascaded operational amplifiers $OA_1$, $OA_2$ providing on line 14 at the output thereof the earlier mentioned control signal for the field current regulator 8. At the input of operational amplifier $OA_1$ are summed the Y signal received on line 12 and the $\alpha$ signal which is a selected fraction derived from the calibration potentiometer CP connected to line 5 from the current sensor 4. Operational amplifier $OA_2$ has unity gain and is merely a conventional signal inverting device.

The current sensor and the summer are conventional equipment preferably of the type sold on the open market by Westinghouse Electric Corporation. The circuitry shown can be readily mounted on printed circuit boards. The current sensor is for instance of the model A130, a product of Westinghouse Electric Corporation. The field current regulator is for instance of the model known as the "F20 Controlled T.P.M. Assembly" (T.P.M. stands for: thyristor pulse modulation). The latter is used generally as a field exciter for direct current motors. This standardized package provides field excitation for a wide range of field currents and voltages. It requires either 230 or 345 VAC 50/60 Hertz single phase power supplied from an isolation transformer mounted separately. A field current feedback scaling potentiometer 90 is included for deriving from line 13 onto line 91 the feedback signal which is to be combined with the control signal, on line 14, at the input of an operational amplifier 41. The field current regulator comprises essentially a field controller 20 and a thyristor power supply (T.P.S.) circuit 21. The T.P.S. circuit 21 is supplied with AC energy from a transformer 22. The AC is converted into DC field current by a single phase full wave rectifier bridge 23 including thyristors 1TH and 2TH associated with respective diodes, 1D, 2D. Between lines 25, 26 the field current is supplied to the field winding 2 of the motor.

A pulse generator P.G. generates gating pulses applied from terminals $G_1G_2$ to the gate electrodes of the thyristors. The current sensing shunt 140 for the feedback loop consists of resistors 5R through 8R. 9R is a self-starting resistor used with highly inductive loads to initiate conduction of the thyristors. A surge suppression network is formed with resistors 1R and 2R, capacitors 1C and 2C, and surge suppressor 1SS. 3R and 4R are voltage feedback resistors.

Considering now the field controller 20, this circuit includes the earlier mentioned operational amplifier 41 at the output of which is derived the control signal which, on line 42, after amplification by amplifier 43 this circuit determines the time sequence of the gating pulses from the pulse generator PG. It includes a time basis which is regulated by a high gain linear voltage amplifier. The control signal on line 42 determines the current charging up a capacitor. Solid state devices are operated with a threshold to release pulses to the gate electrodes of thyristors 1TH and 2TH. The F20 field current controller is standard hardware, as earlier mentioned.

The armature voltage is sensed from lines 60, 60' by a voltage sensor 61 which provides on line 62 a voltage signal which, on line 64, is carried via resistor 96 to the junction point of summer 7.

A tachometer T provides on line 70 a speed signal which is also fed into the summer 7 via potentiometer 71, line 72 and resistor 94.

The operation of the summer of FIG. 3 can best be understood by reference back to FIG. 2 and the explanations already given.

As it appears also from FIG. 3, the voltage signal on line 62 from the voltage sensor 61 is negative while the field current reference and the sensed armature current signals appearing on lines 12 and 5 are positive signals.

Having adjusted the field current for the desired speed N by the potentiometer RP when the load establishes itself at a value for which the armature drop is IR, the C.E.M.F. is V-IR which is defined by signals on lines 5 and 62. The system will balance itself under the effect of the summer 7 so that the error between the speed signal on line 72 and the C.E.M.F. signal due to non-linearities in the flux is cancelled. The field regulator 8 causes such error cancellation by modifying the motor flux accordingly.

It is understood that although the preferred embodiment shows a field current regulator as the motor exciter, any other DC motor regulator can be used, for instance the counter-e.m.f. regulator type.

I claim:

1. In a direct-current motor control apparatus including a field winding and a field current regulator responsive to an armature current signal and a field reference signal for establishing a drooping speed-load characteristic, the combination of:
   means for deriving a motor armature voltage representative signal;
   means for deriving a motor armature current representative signal;
   means for subtracting said armature voltage signal from said armature current signal to derive a speed correction signal;
   means for summing said reference signal with said speed correction signal operative on said regulator to compensate for non-linear field variations as a function of load, thereby to establish a linear speed-load characteristic for said motor through said field current regulator.

* * * * *